Jan. 24, 1961  A. AMBLI  2,969,284
CONVERTER TOP FOR OPEN TOPPED TRAILERS AND THE LIKE
Filed March 11, 1958  2 Sheets-Sheet 1

INVENTOR.
ANDREW AMBLI
BY
Williamson, Schroeder, Adams & Palmatier
ATTORNEYS

Jan. 24, 1961 A. AMBLI 2,969,284
CONVERTER TOP FOR OPEN TOPPED TRAILERS AND THE LIKE
Filed March 11, 1958 2 Sheets-Sheet 2
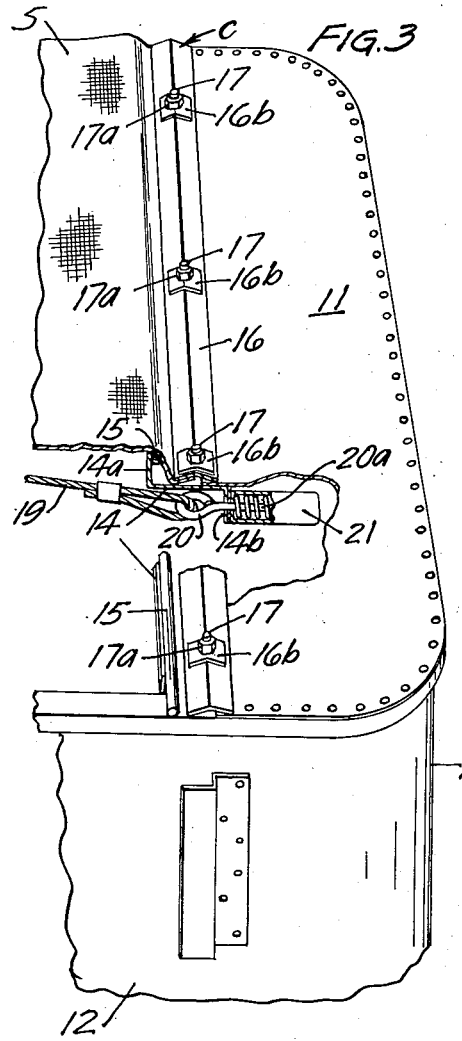
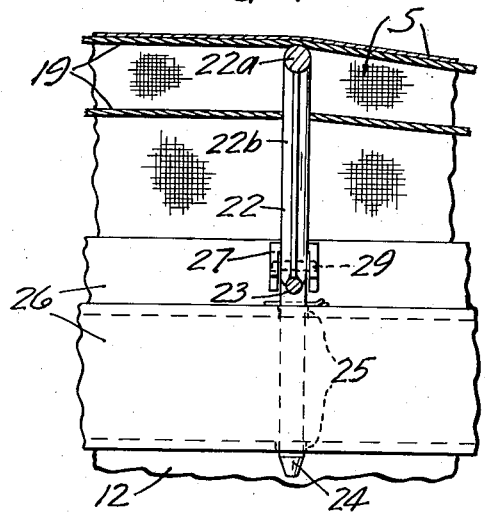
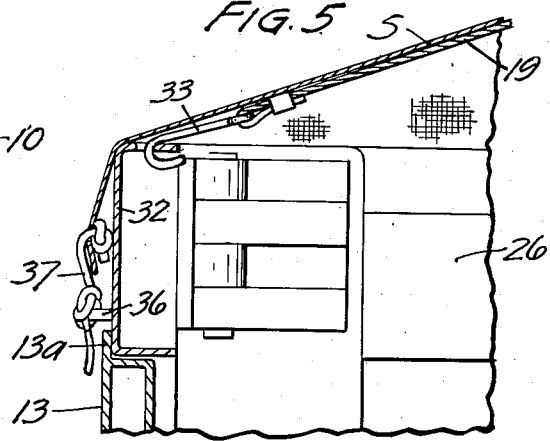
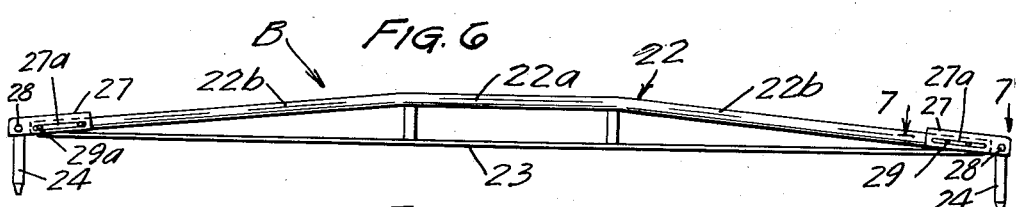
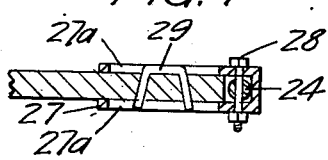
INVENTOR.
ANDREW AMBLI
BY Williamson, Schroeder, Adams & Palmatier
ATTORNEYS United States Patent Office 2,969,284
Patented Jan. 24, 1961

2,969,284
CONVERTER TOP FOR OPEN TOPPED TRAILERS AND THE LIKE

Andrew Ambli, 2360 W. County Road C, St. Paul, Minn.

Filed Mar. 11, 1958, Ser. No. 720,602

2 Claims. (Cl. 296—100)

This invention relates to a very readily installed or removable, flexible top covering for trailers and the like with means for supporting and tensioning the tarpaulin or other material from which the top proper is constructed.

It is an important object to provide a top of the class described which may be very easily and quickly assembled or disassembled and which will be light in weight although strong and durable in its asembled condition and which further, will have minimum resistance to wind in travel.

It is a further object to provide a simple and highly efficient converter top which includes a tensioned tarpaulin or the equivalent clamped along its forward edge to the rear edge of the top of the cap and supported and partially tensioned by closely cooperating metal bows which are readily attachable or detachable relative to the upper edges of the side walls of the trailer and which make provision for spreading apart or slight contraction of the walls of the trailer during transit.

Another object is a provision of a tarpaulin top of the class described, which is securely held and tensioned to prevent flapping and tearing during transportation of the trailer and which when tensioned is in a dome-like formation to form sloping facets, none of which will retain water.

A still further object of the invention is to provide a retaining and tensioning structure closely cooperating with a hinged rear header structure whereby the closing of the divided header serves to finally prepare and tension the supporting structure for the tarpaulin top.

A still further object is a provision in a converter top of the class described of readily removable supporting bows disposed in multiplicity in spaced relation across the upper edges of the side walls of the trailer and used cooperatively with an anti-spreader or fulcrum chain and longitudinal tensioning devices to always properly support and tension the flexible tarpaulin while making provision for slight spreading of the top portions of the walls of the trailer or contraction thereof during loading and subsequent transportation.

These and other objects and advantages of my invention will more fully appear from the following description made in connection with the accompanying drawings wherein like reference characters refer to similar parts throughout the several views, and in which:

Fig. 3 is a perspective view of the upper front portion of the cab of the trailer with the tarpaulin clamp and one of the tensioning cables disclosed, some portions of the tarpaulin being broken away.

Fig. 4 is a detailed vertical section through a portion of the tarpaulin top and one of the cross bows and showing two of the tensioning and supporting cables.

Fig. 5 is a vertical cross section taken substantially along the line 5—5 of Fig. 2;

Fig. 6 is a side elevation of a preferred form of supporting and tensioning bow detached from the trailer structure, and Fig. 7 is an enlarged detail section taken along the line 7—7 of Fig. 6.

Figure 1:
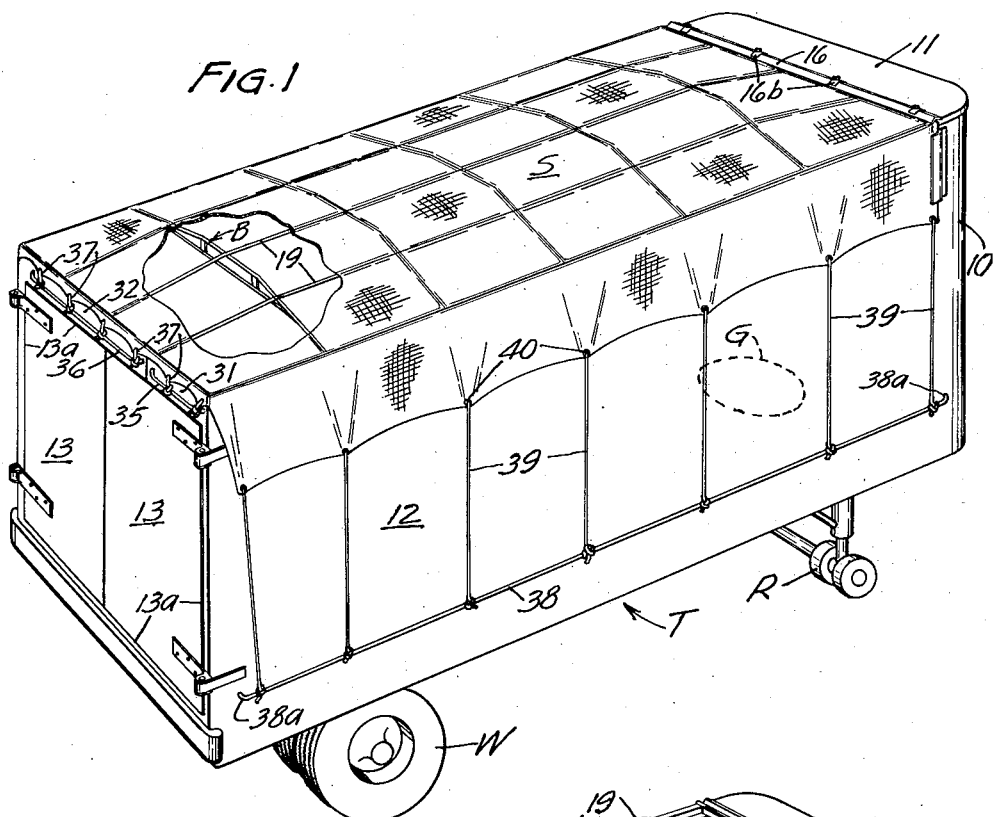
Fig. 1 is rear and side perspective view showing a form of my converter top applied to a conventional open-top trailer.

An embodiment of my novel and improved "Converter Top" is shown applied to a conventional type of semi-trailer indicated as an entirety by the letter T, having an upstanding, convexly curved forward end 10 provided at its top with a streamlined cowl 11 which has a sealed relation with the front 10. The elongated side walls 12 of the trailer extend continuously from the front end 10 and are connected and supported in suitable and conventional manner from the bottom 12a of the trailer body. The body or chassis being supported at its rear end in conventional manner and cushioned by two sets of axially aligned dual wheels, is provided as shown, with the conventional pneumatic tires W.

A front central portion of the trailer at its bottom has an adapter G swivelly supported on the "fifth wheel" of the tractor vehicle (not shown) and when the trailer is unhitched, it is supported in conventional manner upon a trailer retractible roller gear, indicated as an entirety by the letter R.

The rear of the trailer is completed by a pair of vertically hinged doors 13 having out-turned sealing flanges 13a around portions of the configurations thereof and adapted when closed to form a substantially continuous rear wall for the trailer chassis.

Comprising an important component of my invention is a sheet or tarpaulin-clampling-retainer at the rear edge of the cowl structure 11, indicated as an entirety by the letter C. This tarpaulin-clamping structure comprises an elongated sealing seat 14 (see particularly Fig. 3) having a rear, upwardly extending flange 14a, to the inner side and adjacent the upper edge of which is fixed a bead or rod 15, the bottom of said sealing seat extending substantially horizontal and terminating at its forward edge in a downturned flange 14b. Said flange and a portion of the horizontal web of said seat is welded or otherwise rigidly affixed to the rearward edge of the cowl 11. The end portions of the sealing seat are curved or bent downwardly, as shown in Fig. 1, to facilitate attachment of the member and to also provide for windshielding and engagement of the downwardly bent side forward edge portions of the tarpaulin or cover proper. The forward edge of the flexible tarpaulin or other covering sheet, preferably doubled upon itself, is extended over the bead 15 at the rear edge of the seat and then downwardly and against the bottom horizontal web of the seat. This engaged forward edge is tightly clamped against its seat by an obtusely angled ridge member 16 extending the full width of the rear portion of cowl 11 and overlapping and sealing against the forward and preferably doubled forward extremity of the tarpaulin and being clamped in cooperation with the transverse seat through the medium as shown, of similarly angled clamping plates 16b which are centrally apertured to accommodate upstanding threaded studs 17 which are welded at their head ends or otherwise rigidly connected with the bottom side of the seat 14 and which at their outer ends, extend through suitable apertures formed in spaced relation in the apex or central portions of ridge member 16. Clamping nuts 17a threadedly engage the outer ends of the stud screws 17 to effect the clamping and retaining relationship for the forward end of the tarpaulin.

A plurality of longitudinally extending tarpaulin-supporting and tensioning means are shown, having their forward ends detachably connected with the rear edge of the cowl 11 or if desired, directly to the channel or seat 14 affixed to said cowl. Said means preferably are in the form of flexible elements such as cables 19, as shown, three being utilized with the central longitudinal cable disposed generally at a higher level than the two side cables 19 and with the side cables being disposed and maintained at a higher level than the longitudinal upper edges of the trailer walls 12 whereby a doming effect is obtained in the contour of the tensioned flexible tarpaulin S. As shown, the several cables 19 are looped and clenched at their forward ends about loop members 20 having forwardly protruding shank portions 20a, which as shown are received in spring sockets 21 with coil springs surrounding the shank portions. The forward ends of said springs are abutted by a kink or head at the forward end of the shank. Loop members 20 are thus yieldable with high pressures through compression of the springs 20a confined in sockets 21. The ends of each of the sockets as shown, are welded or otherwise suitably affixed to the rear of the depending flange 14b of the clamping seat member 14, but may be secured otherwise to the rear portion of the trailer cowl 11.

Cooperating with the flexible, spaced, longitudinally extending tensioning cables 19 are a plurality of transversely extending, readily removable bows of substantially rigid structure. These bows designated in their entireties by the letter B, are important components of my invention and preferably comprise in each instance, a strong metallic rod or tubular member 22 and which in the form shown is arched by the introduction of a substantially straight, intermediate arch portion 22a whereupon the central cable 19 is supported. Side portions 22b of the bows decline from said central portion 22a and the two side cables 19 are supported thereon.

A longitudinal brace rod 23, as shown, is provided for each of the bows B extending as shown in a straight line and being welded at its ends or otherwise rigidly connected with the arched main bow member 22, thus producing with the arched member, a generally shallow triangular shaped structure for each bow. Each bow B carries at the two ends thereof, depending stud members 24 tapered at their outer extremities for ready insertion and securing into depending open-topped sockets 25 provided at regular spaced intervals in the top rails 26 of the side portions 12 of the trailer.

The ends of the main bow members 22 are connected with the respective upper ends of the stud members 24, as shown by inverted channel plates 27. The outer ends of the channel plates, on their vertical webs, have axially aligned openings for accommodating pivot bolts 28 which pass through suitable diametric bores in the upper ends of studs 24. The channel plates 27 have horizontally aligned, longitudinal slots 27a formed in the vertical webs thereof and the terminal portions of the main bow member 22 have diametric bores therethrough, aligned with the respective slots of each channel plate 27 for accommodation of coupling members which, in the preferred form of my structure, comprise heavy U-shaped wires or rods 29 and 29a respectively.

It is highly important that at least one of the slot and pin connections through channel plates 27 between at least one end of the main bow member 22 and its connected, depending stud 24, be slidably adjustable within limits, to compensate for lateral spreading or contraction of the upper portions of the side walls 12 of the vehicle during certain load or unloaded conditons. To this end as shown in Figs. 6 and 7, the U-shaped connection or link 29 has the legs of the U spaced apart a shorter distance than the total length of the related slot 27a. This provides for relative sliding of the U-link in the confining slot, preferably from three fourths of an inch to an inch and a half. Both link connections of the bow member with the respective studs 24 may be similarly formed for such adjustment. As shown, the left hand slot and pin connection employing link 29a has its legs spread apart to substantialy fill the length of the associated slot 27a. It will be noted (see Fig. 7) that the U-shaped connector links have their legs diverging to lock the same in place to prevent displacement.

It is usually desirable, particularly with long trailers, to employ in combination with the laterally adjustable bows B, a plurality of readily adjustable, anti-spreader chains 30 (see Fig. 2), said chains being of conventional structure and having attached to one of the free ends of each thereof, a hook 30a which may be selectively engaged with various of the links adjacent the opposite free end. When the trailer is loaded to capacity, two or more of said anti-spreader chains are tensioned and affixed to interconnect intermediate portions of the upper edges of the side walls 12 of the trailer.

Figure 2:
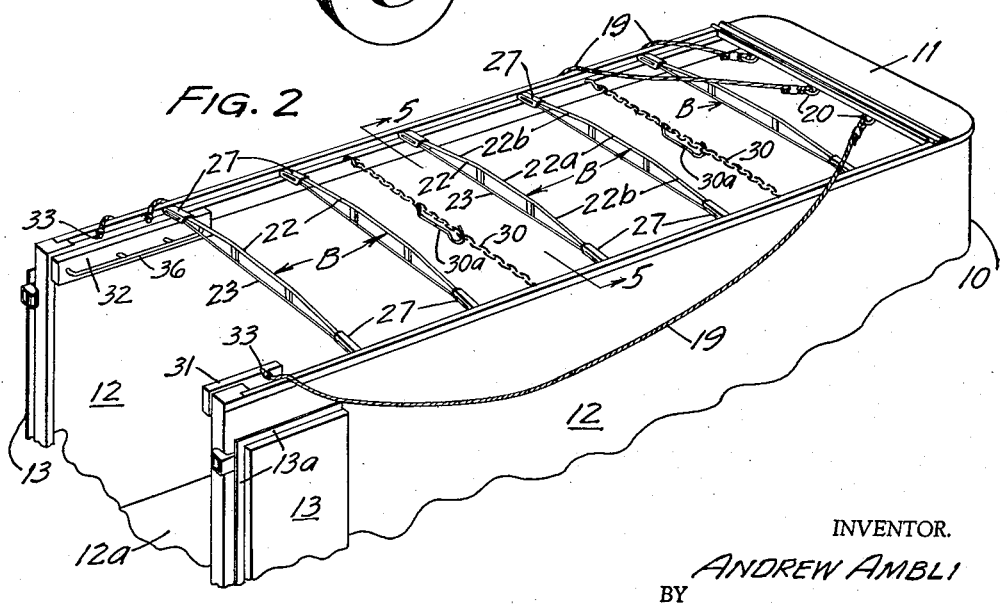
Fig. 2 is a similar perspective view with a portion of the trailer cut away and with the tarpaulin top removed, the divided rear header opened and a portion of the support means or cables retracted for loading of the trailer.

Closely cooperating, for tarpaulin-tensioning effect with the structure previously described and my novel bow structure and connections, is an interconnected rear split-header construction which per se constitutes the subject matter of my United States Letters Patent No. 2,741,507, granted April 10, 1956. This split-header construction described in my patent and as illustrated in Fig. 2, comprises a pair of hinged header sections 31 and 32 of preferably unequal lengths rigidly interlocked and latched in longitudinally aligned relation for travel and swingable inwardly as shown in Fig. 2, when the load is to be removed. The rear ends of the tensioning cables 19 are preferably removably connected with the respective header members 31 and 32, as shown in Fig. 2. The central of said cables and the left hand cable is connected by hooks or the equivalent 33, with apertures formed in the top, horizontal web of the longer or left hand channel header section 32, while the right hand cable 19 is similarly connected by hook 33 with the aperture formed in the upper horizontal web of the shorter header channel, section 31.

It will be seen that when the header members 31 and 32 are unlatched and swung forwardly, that the several longitudinal tensioning cables 19 are slacked, thereby releasing the tension to a considerable extent upon the tarpaulin S. When the trailer is loaded and the header members 31, 32 are swung into longitudinally aligned, locked position and latched, the cables are automatically tensioned, thereby producing the necessary doming effect longitudinally throughout the effective length of the tarpaulin. The take-up latch structure disclosed in detail in my said Patent No. 2,741,507 is provided at the free ends of the header sections 31 and 32 which draws the free ends of the header sections together and very positively locks the same into abutted relation.

Means are provided on the rear vertical webs of the header channels 31 and 32, such as transverse rigid tie rods 35 and 36, secured to header members 31 and 32, respectively, as shown in Fig. 1. On the rear end of tarpaulin S, short tie ropes 37 are provided to properly tension the same.

Suitable means are provided for neatly securing the side depending edges of the tarpaulin sheet S to the side walls of the trailer, as shown in Fig. 1, comprising near the rear portion of the respective side walls, a longitudinal rigid rod 38 spaced throughout its length slightly from the outer surface of the side wall and having its extremities 38a inturned and rigidly connected with the respective wall. A plurality of flexible, vertically disposed connecting elements such as ropes 39 are secured at their upper ends to grommets 40, provided in longitudinally spaced relation along the respective side edges of the tarpaulin. The lower ends of the ropes 39 may be interconnected with the horizontal rods 38 at spaced points and of course the ropes are pulled tightly to place the requisite tension on the respective side edges of the tarpaulin before the same are tied or made fast.

From the foregoing description, it will be seen that I have provided a flexible top covering or "converter-top," which may be very readily attached or detached to or from many types of conventional trailers; which is light in weight although strong and durable in its assembled condition and which has minimum resistance to wind in travel.

It will be further seen that wide adjustability for tightly clamping the forward edge of the flexible tarpaulin sheet or the like is provided throughout the entire width thereof, with provision through cooperation between self-adjusting bow members and longitudinal tensioning cables, for producing the desired stretching and doming of the cover or tarpaulin throughout the length thereof.

My invention provides for variations in the spaced relation between the upper edges of the side trailer walls due to different load conditions. The connections of the bow members along at least one of the ends of the respective members are slidably adjustable within limits, to make such provision.

It will further be seen that there is a close cooperation between my patented split-header construction for the rear of trailers and the longitudinal tensioning cables which are slacked when the headers are uncoupled and swung inwardly and which are tensioned when the headers are swung outwardly and latched and positively locked in longitudinally aligned, operative position.

It will of course be understood that various changes may be made in the form, details and arrangements of parts without departing from the scope of my invention.

What is claimed is:

1. A converter top for normally open-topped-trailer vehicles which inherently have front and side walls and media forming a rear wall structure, comprising a generally rectangular, flexible cover, means for detachably securing the forward edge of said cover to the upper portion of said front wall along a transverse line with doming of said secured edge, a plurality of longitudinally spaced, transverse, arched bow members interconnecting at corresponding points, the upper edge portions of the side-trailer-walls and underlying, supporting and doming the said flexible cover, a plurality of transversely spaced, longitudinal, flexible tensioning elements supported upon said bow members beneath said cover and having their forward ends connected with the upper portion of the front trailer wall, said media forming the rear wall structure including a split-header structure at the top thereof comprising a pair of inwardly swingable, horizontal sections hinged on vertical axes and locking means for securing the free ends of said sections together in aligned and abutted relation and the rear ends of said flexible tensioning elements being secured to said swingable header sections at points eccentric to the axes of swinging of said header sections to release tension on said elements when said sections are swung inwardly and to tension said elements when said sections are swung outwardly into aligned, abutting and operative positions.

2. The structure set forth in claim 1 and said arched bow members having detachable coupling connections at their ends with the upper edge portions of the side walls of the trailer, the coupling connections at at least one end of each of said bow members having provision for horizontal free sliding action transversely of the vehicle.

References Cited in the file of this patent

UNITED STATES PATENTS

| | | |
|---|---|---|
| 1,031,206 | Sowers | July 2, 1912 |
| 2,443,478 | Reid | June 15, 1948 |
| 2,565,746 | Turner | Aug. 28, 1951 |
| 2,591,050 | Butsch | Apr. 1, 1952 |
| 2,679,432 | Ruth | May 25, 1954 |
| 2,807,499 | Duddleston | Sept. 24, 1957 |

FOREIGN PATENTS

| | | |
|---|---|---|
| 361,486 | Great Britain | Nov. 26, 1931 |